United States Patent
Brenden et al.

(10) Patent No.: US 6,597,134 B2
(45) Date of Patent: Jul. 22, 2003

(54) HARD DRIVE SPINDLE MOTOR CONTROLLER WITH SOFT COMMUTATION

(75) Inventors: Jason P. Brenden, Eagan, MN (US); David W. Kelly, Lino Lakes, MN (US); Michael J. Peterson, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/859,951

(22) Filed: May 17, 2001

(65) Prior Publication Data

US 2002/0190673 A1 Dec. 19, 2002

(51) Int. Cl.[7] .............................................. H02K 23/00
(52) U.S. Cl. ........................ 318/254; 318/138; 318/439
(58) Field of Search ................................ 318/254, 439, 318/138

(56) References Cited

U.S. PATENT DOCUMENTS

| | | | |
|---|---|---|---|
| 3,573,577 A | * | 4/1971 | Boyd ........................ 318/718 |
| 4,514,667 A | * | 4/1985 | Sakmann et al. ............ 318/138 |
| 4,539,514 A | * | 9/1985 | Espelage et al. ............ 318/713 |
| 4,763,347 A | * | 8/1988 | Erdman ...................... 318/254 |
| 4,876,491 A | * | 10/1989 | Squires et al. .............. 318/138 |
| 5,208,518 A | * | 5/1993 | Grapenthin et al. ........ 318/138 |
| 6,020,695 A | | 2/2000 | Kelly et al. ................... 318/49 |
| 6,034,493 A | * | 3/2000 | Boyd et al. ................. 318/138 |
| 6,051,942 A | * | 4/2000 | French ....................... 318/254 |
| 6,104,152 A | * | 8/2000 | Coles et al. ................ 318/254 |

* cited by examiner

*Primary Examiner*—Rita Leykin
(74) *Attorney, Agent, or Firm*—Kinney & Lange, P.A.

(57) ABSTRACT

A pulse width modulation controller for a hard disc drive spindle motor controls the rapid spin up of the spindle motor from a stop condition to normal operating speed using a multi-level peak current limiting and six state commutation. At the beginning of each commutation state, peak motor current is limited to less than its steady state peak value for a selected number of pulses. The peak current target then returns its normal level for the remainder of the commutation state. By reducing the peak current target for several pulses after each commutation state change, the effective supply current spike at commutation is reduced or eliminated.

19 Claims, 3 Drawing Sheets

HARD DRIVE SPINDLE MOTOR CONTROLLER WITH SOFT COMMUTATION

CROSS-REFERENCE TO RELATED APPLICATION(S)

None.

BACKGROUND OF THE INVENTION

The present invention is related to a control circuit for controlling operation of a three phase motor. In particular, the present invention is a motor controller which limits power supply current draw as a hard drive spindle motor is spun up from a stop condition to its normal operating speed.

Spindle motors used in hard disc drives of computers are typically three phase motors having three terminals. When a computer is first started, the hard drive spindle motor is typically spun up from a stopped condition by a motor controller circuit using classic six state commutation, with peak current limiting and a relatively high motor current. A typical spin up of the spindle motor is from zero RPM to 15,000 RPM in about 5 seconds. To spin up the motor as quickly as possible, the start current is set as high as the hard drive power supply can deliver. In some systems, when the spindle motor approaches its normal operating speed (e.g. between about 95 to 100 percent of normal speed) control of the spindle motor is transferred to a second motor controller circuit which provides sinusoidal drive to the three terminals using pulse width modulation.

Peak current limiting during spin up operates by allowing the current through the motor to ramp up to a programmed maximum as one terminal is tied to the operating high voltage and another terminal is tied through a sense resistor to the operating low voltage. While the terminals are tied or connected in this fashion, the motor current ramps up through the motor inductance and resistance between the two terminals. The motor current is measured by measuring the voltage across the sense resistor. When the current through the motor reaches the peak current, the two terminals (which had been connected between a high voltage and a low voltage) are connected to the same voltage. This allows the motor current to decay from the peak current value. Since the motor coil acts an inductor, the motor current does not drop to zero instantaneously. Instead, the current decays at an approximately linear rate. Typically, the off time during which both terminals are connected to the same voltage is not long enough for the motor current to decay completely to zero. Usually the motor current decays by about 10 to 25 percent. When the two motor terminals are switched back to the state where one terminal is at high voltage and the other is at low voltage, the motor current is already at 75 to 90 percent of the peak current, and ramps up from that point until the peak current is again reached. Each time that peak current is reached, two terminals are connected to the same voltage and motor current is allowed to decay.

During the spin up phase of operation, the current flowing through motor from the high operating voltage to the low operating voltage is seen across the sense resistor as a series of short, nearly rectangular pulses. The current is only drawn from the power supply (or a supply bypass capacitor in parallel with the power supply) when the two terminals are in the state where they are connected to different voltages. When the two terminals are connected to different voltages, the current flow is from the power supply into the high voltage terminal, through the motor, and out the low voltage terminal of the motor and through the sense resistor to ground. When the two terminals are both connected to the high operating voltage, the current flow is from the power supply node into the high voltage terminal, through the motor, and back to the power supply node. Therefore, no motor current is drawn from the power supply or bypass capacitor. Current does flow from the power supply into the bypass capacitor during this time. Thus, the current draw is represented by the voltage pulses across the sense resistor. The supply bypass capacitor tends to filter these narrow supply current pulses, which reduces the peak load current seen by the power supply. An average motor current is set by the alternation between the two states in which a pair of motor terminals are connected to high and low voltages or to the same voltage.

With a low resistance motor, the current off time may be significantly greater than the on time. This results in an average current which is significantly less than ½ of the peak current. At commutation (which occurs every sixty degrees of rotation) the motor drive circuit switches motor phases so that a different pair of terminals of the three motor terminals are used for connection to the operating high voltage and the operating low voltage. A much wider current pulse occurs immediately following commutation, which increases the effective peak load current. This wider pulse is due to the fact that the motor current must flow through an inductor that previously did not have current flowing through it (i.e. the motor winding connected to the terminal which previously was not connected to either the high or the low voltage). This requires the current to ramp up from zero to the peak current, instead of from about 75 to 90 percent of peak to the peak current. The result is a much longer current ramp time immediately following commutation. This results in a larger current draw from the power supply. In the past, the problem of larger current draw resulting from the longer current ramp time following commutation was addressed by using a power supply having a larger current capacity or by using a larger bypass capacitor. Both approaches result in a more expensive spindle motor system.

BRIEF SUMMARY OF THE INVENTION

A motor controller circuit for a three phase electric motor uses six state commutation. Motor current is controlled by using peak current detection. A peak current target is compared to sensed motor current each time that one motor terminal is tied to an operating high voltage and another terminal is tied to an operating low voltage. When the sensed motor current reaches the peak current target, the two motor terminals are connected to the same voltage, which allows motor current decay. The present invention features "soft commutation" in which the peak current target is reduced immediately following each change of commutation state. Subsequently, the peak current target is increased to a higher level for the remaining portion of the commutation state. With the present invention, the effective power supply current spike at commutation is reduced.

DETAILED DESCRIPTION

Figure 1:
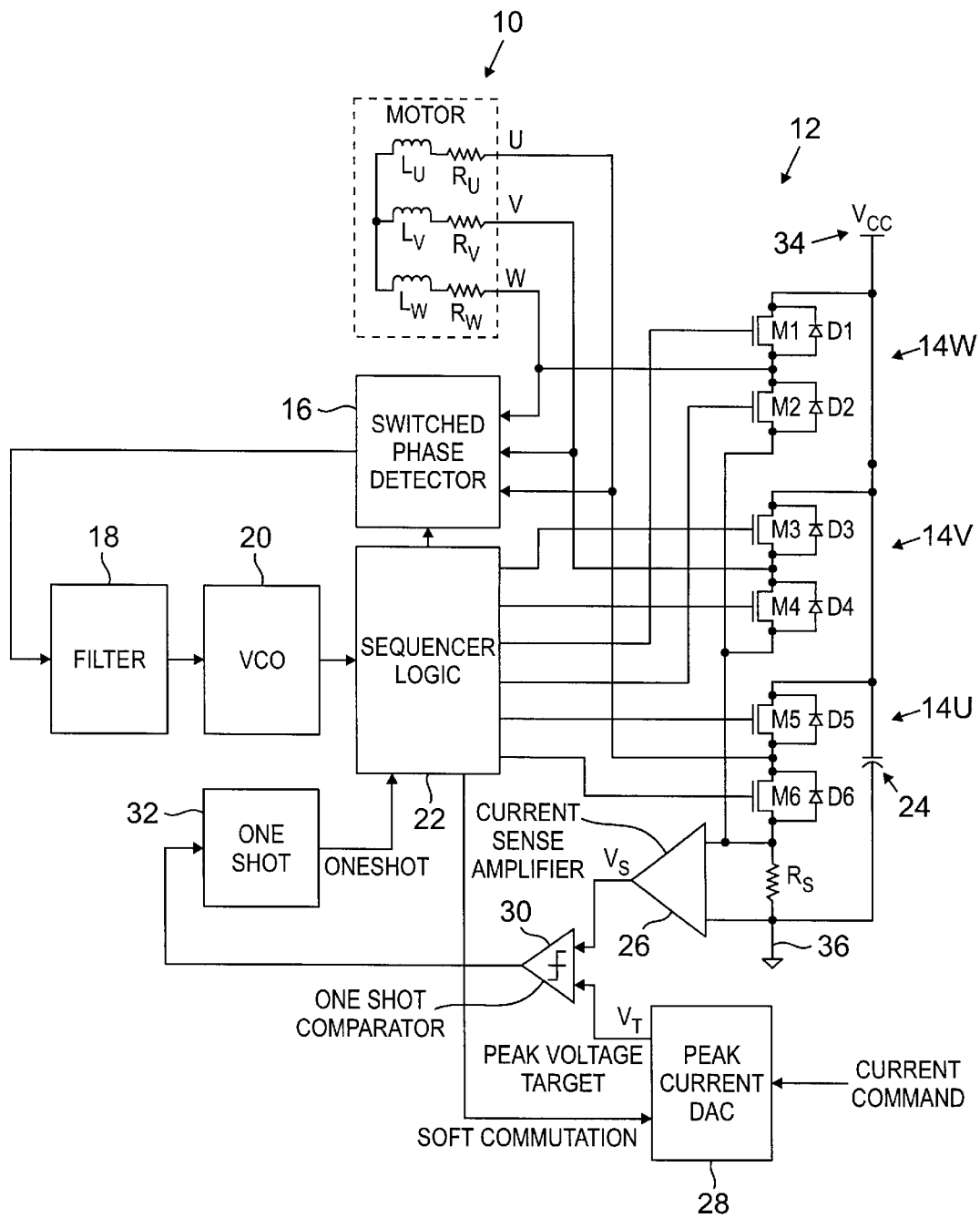
FIG. 1 is a block diagram of a motor controller for a three phase motor.

FIG. 1 is a block diagram showing three phase motor 10 and motor controller 12, which includes the soft commutation feature of the present invention. Three phase motor 10 is, for example, a spindle motor used in a hard disc drive. Motor controller 12 allows motor 10 to spin up rapidly from a stopped condition to its normal operating speed using six state commutation with peak current limiting. The peak voltage target (representing a current command) is adjusted for brief period of time after each commutation in order to reduce the power supply current required to operate motor 10 and controller 12. In some embodiments, once motor 10 approaches normal operating speed (e.g. at 95% to 100% of normal speed), a sinusoidal motor controller (not shown) takes over control of motor 10.

Three phase motor 10 has three terminals labeled U, V, and W, three stator coils $L_u$, $L_v$, and $L_w$ and associated internal resistance $R_U$, $R_V$, and $R_W$. As motor 10 spins, a voltage called the Back Electro Motive Force (BEMF) is generated by moving the motor magnetic fields through coils $L_u$, $L_v$, and $L_w$. Voltages at terminals U, V, and W change due to this BEMF voltage. The three terminal voltages have the general shape of sinusoids, which are displaced by 120 degrees relative to each other. At the end of 360 degrees, the terminal voltages have returned to their original voltages.

The following information is a result of these three sinusoidal terminal voltages: for the first 120 degrees, terminal U has the lowest voltage of the three terminals; for the second 120 degrees, terminal V has the lowest voltage; and for the last 120 degrees, terminal W has the lowest voltage. For the first 60 degrees, terminal V has the highest voltage, for the next 120 degrees terminal W has the highest voltage, for the next 120 degrees terminal U has the highest voltage, and for the last 60 degrees, terminal V has the highest voltage. For the first 60 degrees, terminal W has an intermediate voltage, which is neither the highest nor the lowest voltage. For the next 60 degrees, terminal V has an intermediate voltage, and for the next 60 degrees terminal U has an intermediate voltage. This pattern of intermediate voltage repeats between 180 degrees and 360 degrees. This is shown in Table 1 below:

TABLE 1

| Commutation State | 1 | 2 | 3 | 4 | 5 | 6 |
|---|---|---|---|---|---|---|
| | | 60° | | 180° | | 300° |
| Highest voltage | V | W | | U | | V |
| In between | W | V | U | W | V | U |
| Lowest voltage | | U | | V | | W |
| | 0° | | 120° | | 240° | 0° |

Motor controller 12 includes motor drivers 14U, 14V, and 14W, switched phase detector 16, filter 18, voltage controlled oscillator (VCO) 20, sequencer logic 22, bypass capacitor 24, current sense resistor Rs, current sense amplifier 26, current control digital-to-analog convertor DAC 28, one shot comparator 30 and one shot 32. Power to motor controller 12 is supplied from a power supply (not shown) through $V_{CC}$ power supply terminal 34 and ground power supply terminal 36.

Each motor driver 14U, 14V, 14W is a half bridge switching circuit formed by a pair of MOSFET switches and associated diodes. Motor driver 14 W is formed by switches M1 and M2 and diodes D1 and D2. M1 has its drain connected to $V_{CC}$ and its source connected to terminal W. M2 has its drain connected to terminal W and its source connected through sense resistor Rs to ground terminal 36. The gates of M1 and M2 are connected to sequencer logic 22.

Motor driver 14V is formed by MOSFETs M3 and M4 and diodes D3 and D4. The drain of M3 is connected to $V_{CC}$ terminal 34, and the source of M4 is connected through sense resistor Rs to ground terminal 36. The source of M3 and the drain of M4 are connected to motor terminal V. Sequencer logic 22 is connected to the gates of M3 and M4.

Motor driver 14U is formed by MOSFETs M5 and M6 and diodes D5 and D6. The drain of M5 is connected to $V_{CC}$ terminal 34 and the source of M6 is connected through sense resistor Rs to ground terminal 36. The source of M5 and the drain M6 are connected to motor terminal U. The gates of M5 and M6 are connected to the output of sequencer logic 22.

The inputs of switched phase detector 16 are connected to motor terminals U, V, and W. The undriven phase of motor 10 is monitored by switched phase detector 16 and is compared against the average of the three phases. The output of switched phase detector 16 is connected through filter 18 to the input of VCO 20. The output of VCO 20 is supplied to the input of sequencer logic 22. Together, switched phase detector 16, filter 18, VCO 20 and sequencer logic 22 form a phase locked loop circuit which determines when to commutate motor 10 by controlling the operation of motor drivers 14U, 14V, and 14W.

Switched phase detector 16 also receives signals from sequencer logic 22 which indicate each time the commutation state changes and which identify the current commutation state. Based on those signals, switched phase detector 16 compares the voltage at the undriven terminal (e.g. W in commutation state 1 from 0° to 60°) with an average voltage from all three terminals. The result of the comparison is exclusively ORed with a signal identifying even (or odd) commutation states.

The output of switched phase detector 16 is a signal which is proportional to the phase error. If motor 10 is in a steady state condition, (i.e. the speed is not changing), the duty cycle of the output of switched phase detector 16 is 50%. During spin up, motor speed is increasing, and the duty cycle of switched phase detector 16 causes pumping up of filter 18 on average.

VCO 20 produces a clock signal which is a function of the voltage received from filter 18. As motor speed is increasing, filter 18 is pumped up on average, and therefore the clock signal from VCO 20 increases. The clock signal from VCO 20 is divided down by sequencer logic 22 and is used to determine each change of commutation state. For example, if VCO 20 produces a clock pulse for each 6 degrees of motor rotation, sequencer logic 22 divides the VCO clock signal frequency by ten to define a commutation state change every 60 degrees of rotation. The VCO clock signal also may be used to determine when to switch from spin up to sinusoidal motor control, since the VCO clock frequency varies with motor speed.

During spin up operation, MOSFETs M1–M6 are pulsed in time with motor 10 to maintain or increase the motor speed. For the 120 degrees of rotation (i.e. two commutation states) during which one terminal has the highest voltage, that terminal is tied to $V_{CC}$ through its associated motor driver 14U, 14V, or 14W. For example, between 6020 and 180° (commutation states 2 and 3) as shown in Table 1, terminal W has the highest voltage. During those 120 degrees, sequencer logic 22 turns on M1 and turns off M2 of motor driver 14W. As a result, terminal W of motor 10 is connected through M1 to $V_{CC}$.

For the 60 degrees of rotation (i.e. one commutation state) that a terminal has an intermediate voltage, that terminal is floating, and both MOSFET switches associated with that terminal are off. For example, during commutation state 2 (between 60° and 120°) in Table 1, terminal V has the intermediate voltage. In that case, sequencer logic 22 has turned off MOSFETs M3 and M4 so that terminal V is not connected to either $V_{CC}$ terminal 34 or to ground terminal 36. During a commutation state when a terminal is left floating, its voltage is monitored by switched phase detector 16.

For the 120 degrees (two commutation states) that a terminal has the lowest voltage, that terminal is pulse width modulated. During pulse width modulation, the terminal is switched between the low voltage (connected through sense resistor Rs to ground terminal 36) and the high voltage (connected to $V_{CC}$ terminal 34). When the terminal is switched to low voltage, the inductance between the high and low terminals charges and the motor current rises. When the terminal having the lowest voltage is switched to the high voltage ($V_{CC}$ terminal 34), the inductances discharge and motor current falls. Average current through motor 10, which controls motor torque, is controlled by this method.

In the example shown in Table 1, terminal U has the lowest voltage in commutation states 1 and 2 (between 0° and 120°). During that time, sequencer logic 22 alternates turning on MOSFETs M5 and M6 of motor driver 14U. This causes terminal U to be connected alternately to $V_{CC}$ terminal 34 or through resistor Rs to ground terminal 36.

The pulse width modulation operation of one of the three motor drivers 14U, 14V, and 14W while its respective terminal has the lowest voltage is controlled using peak current detection. The peak current detection control of motor controller 12 includes sense resistor Rs, current sense amplifier 26, current control DAC 28, comparator 30, one shot 32, and sequencer logic 22. The peak current detection control senses current through motor 10 while the pulse width modulated terminal is low (i.e., when that terminal is connected through sense resistor Rs to ground terminal 36). Current sense amplifier 26 senses voltage across resistor Rs, which represents the sensed motor current and provides the sensed motor current in the form of voltage Vs to the + input terminal of comparator 30. The desired motor current is represented by a peak target voltage $V_T$ supplied by current control DAC 28 in response to a current command input signal which represents the normal operating current of motor 10.

Comparator 30 compares the output voltage Vs of current sense amplifier 26 and the target voltage $V_T$ from DAC 28. When Vs exceeds $V_T$, one shot comparator 30 fires. This causes the output of one shot 32 to go high for a programmable period of time. While one shot 32 is high, sequencer logic 22 switches the motor driver for the pulse width modulated terminal so that the pulse width modulated terminal is connected to the high voltage ($V_{CC}$ terminal 34). This allows motor current to decay.

Each time that a commutation state change occurs (which will occur every 60 degrees of rotation of motor 10), sequencer logic 22 provides a Soft Commutation signal to current control DAC 28, which causes DAC 28 to reduce the peak voltage target $V_T$ supplied to comparator 30 to a predetermined fraction of its normal value $V_{TN}$. As a result, one shot 32 will trip at a lower sensed motor current. This limits the power supply current spike due to charging the motor inductance at commutation. In one embodiment, the predetermined fraction of the normal target value is changed gradually by sequencer logic 22 in response to pulses from one shot 32. After a predetermined number of one shot pulses, current control DAC 28 has returned the peak voltage target to its normal value for the remainder of time that the commutation state remains the same. This process repeats with each change of commutation state.

One example of a "soft commutation" change of target values uses five reduced target steps: $V_T = \frac{2}{3} V_{TN}$, $V_T = \frac{5}{6} V_{TN}$, $V_T = \frac{11}{12} V_{TN}$, $V_T = \frac{23}{24} V_{TN}$, $Vt = \frac{47}{48} V_{TN}$ and then back to the normal target value $V_T = V_{TN}$. Other embodiments of the invention use a different number of steps and/or different fractions of the normal target value.

Figures 2A, 2B:
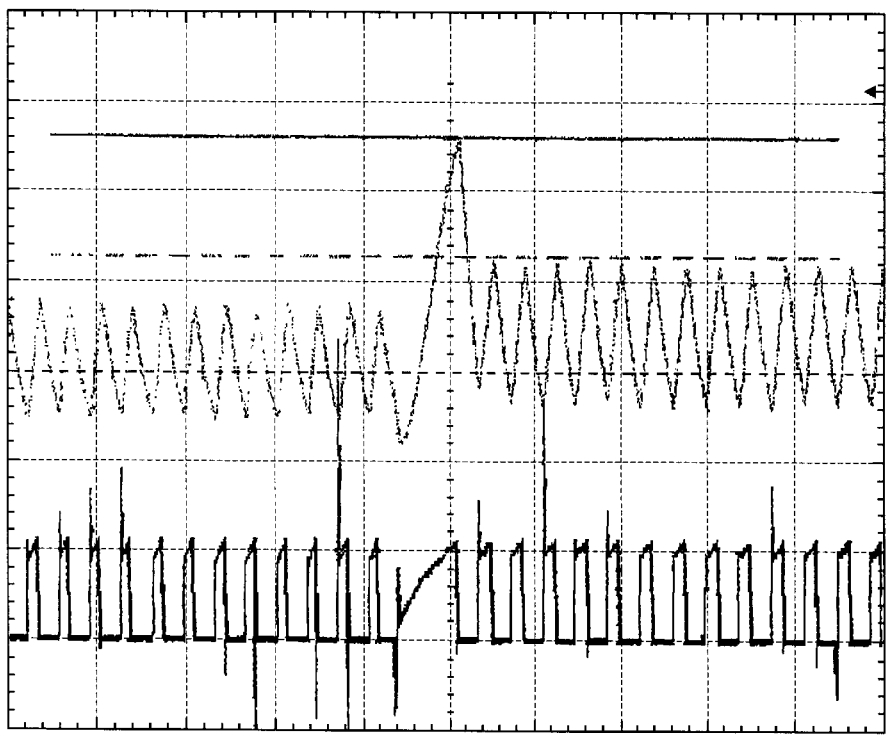
FIGS. 2A and 2B show power supply current and voltage across the current sense resistor produced by the motor controller of FIG. 1 when soft commutation in accordance with the present invention is not used.

FIGS. 2A and 2B illustrate the operation of motor controller 12 without the soft commutation feature of the present invention. In other words, FIGS. 2A and 2B illustrate the operation of the motor controller 12 when peak voltage target $V_T$ is unchanged following commutation.

FIG. 2A shows power supply current, while FIG. 2B shows voltage Vs as a function of time beginning shortly before commutation (i.e., a change in commutation state). In FIGS. 2A and 2B, twelve pulses of voltage Vs are shown prior to commutation, and fourteen pulses of Vs are shown following commutation. In each case, when one shot 32 times out, sequencer logic 22 turns on the appropriate MOSFET M2, M4, or M6 to allow current to flow through resistor Rs to ground. Prior to commutation, current is already flowing through two of the coils of the motor, and the time required for voltage Vs to ramp up to target voltage $V_T$ is relatively short.

When commutation occurs, the terminal that was floating during the previous commutation state is now connected to the highest voltage or the lowest voltage. The coil associated with that terminal did not have current flowing through it in the previous commutation state. As a result, when one shot 32 times out following commutation, the current through Rs (and therefore the voltage Vs) must ramp up from zero to the peak target voltage $V_T$. FIG. 2B illustrates the much longer Vs pulse immediately following commutation. Following the initial longer Vs pulse, the Vs pulses return to the shape which they had prior to commutation.

The effect of the longer initial Vs pulse following commutation is shown in FIG. 2A. Power supply current rises to a significantly higher level during the first two Vs pulses following commutation. The power supply must be designed to accommodate this higher current demand, even through it occurs only for a relatively short period following each commutation. Although the peak current demands can also be accommodated by using a much larger supply bypass capacitor 24, both of the design alternatives involve increased costs to accommodate the peak current demands following commutation.

Figures 3A, 3B:
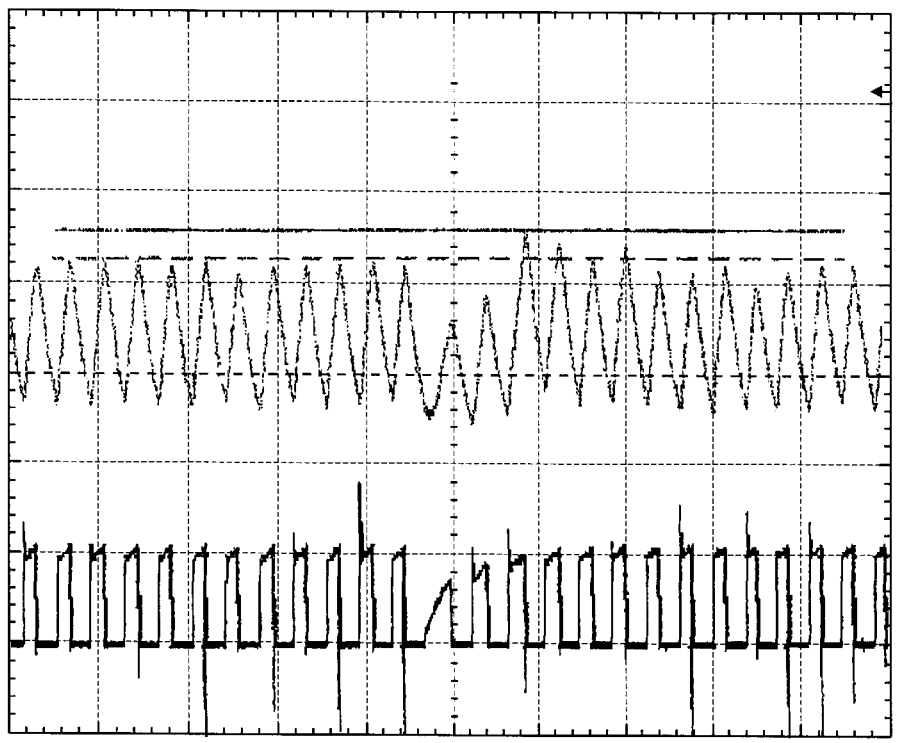
FIGS. 3A and 3B show power supply current and voltage across the current sense resistor when soft commutation is used with peak target voltage reduced and then gradually increased to its normal value following commutation.

FIGS. 3A and 3B show the operation of motor controller 12 with an embodiment of the soft commutation feature of the present invention. FIG. 3A shows power supply current and FIG. 3B shows voltage Vs across sense resistor Rs as a function of time. As in the previous FIGS. 2A and 2B, two pulses of voltage Vs are shown prior to commutation, and fourteen pulses are shown after commutation.

As illustrated in FIG. 3B, sequencer logic 22 provides Soft Commutation signals to DAC 28 which cause peak target voltage $V_T$ to be reduced to $\frac{2}{3} V_{TN}$ for the first pulse following commutation. With each successive pulse, $V_T$ is increased until $V_T = V_{TN}$ at the sixth pulse following commutation.

As illustrated in FIG. 3A, the peak power supply current remains relatively unchanged following commutation as a result of the initial reduction of the $V_T$ and its gradual restoration to its normal value following commutation.

With the soft commutation feature of the present invention, power supply current spikes at commutation are decreased or eliminated. As a result, a less expensive power supply maybe used, while still achieving the rapid spin up of the motor using six state commutation and peak current control. The soft commutation feature makes use of circuitry already present, and therefore involves little additional expense while avoiding the use of a more expensive power supply, a more expensive supply bypass capacitor, or both. The motor controller with soft commutation is preferably fabricated in an integrated circuit.

Although the present invention has been described with reference to preferred embodiments, workers skilled in the art will recognize that changes may be made in form and detail without departing from the spirit and scope of the invention.

What is claimed is:

1. A motor controller for an electric motor having a plurality of motor terminals, the motor controller comprising:
   a commutation control connected to the motor terminals for causing current pulses to flow through one of the terminals during each commutation state;
   a current sensor for providing a sense signal representative of the current pulses;
   a peak current target circuit for providing a target signal;
   a pulse width control for controlling pulse width of the current pulses as a function of the sense signal and the target signal; and
   a soft commutation control for adjusting the target signal as a function of commutation state change.

2. The motor controller of claim 1, wherein the pulse width control includes a comparator which compares the sense signal and the target signal and a pulse generator which supplies a control pulse to the six state commutation control when the comparator provides an output indicating that the sense signal has reached the target signal.

3. The motor controller of claim 2, wherein the six state commutation control terminates the current pulse in response to a control pulse from the pulse generator.

4. The motor controller of claim 1, wherein the peak current target circuit provides the target signal as a function of a current command representative of a desired motor current.

5. The motor controller of claim 1, wherein the soft commutation control causes the peak current target circuit to reduce the target signal for a predetermined number of current pulses following each change of commutation state.

6. The motor controller of claim 1 wherein the motor has N motor terminals and the commutation control defines 2N commutation states.

7. The motor controller of claim 6, wherein N=3.

8. The motor controller of claim 1 wherein the motor controller is fabricated in an integrated circuit.

9. A motor controller for an electric motor in which motor speed is controlled by commutation in which motor current pulses are peak current limited, the motor controlling including:
   a circuit for adjusting the peak current of a predetermined number of the motor current pulses as a function of commutation state change, wherein the circuit comprises:
   means for providing a target signal as a function of a current command signal and a control signal;
   means for providing a sense signal representative of sensed motor current; and
   means for controlling pulse width of current pulses to the electric motor as a function of the target signal and the sense signal.

10. The motor controller of claim 9 wherein the contfol signal causes the means for providing a target signal to reduce the target signal for a predetermined number of current pulses following a change of commutation state.

11. A motor controller for controlling speed of an electric motor having a plurality of terminals, the motor controller comprising:
   a plurality of motor drivers connected to the plurality of the terminals;
   sequencer logic for providing control signals to the motor drivers to cause current pulses to flow through one of the terminals during each commutation state, the sequencer logic providing a soft commutation signal as a function of commutation state change;
   a current sensor for providing a sense signal representative of the current pulses;
   a peak current target circuit for providing a target signal which is a function of a current command signal and the soft commutation signal; and
   a pulse width control for controlling pulse width of the current pulses as a function of the sense signal and the target signal.

12. The motor controller of claim 11, wherein the pulse width control includes a comparator which compares the sense signal and the target signal and a pulse generator which supplies a control pulse to the sequencer logic when the comparator provides an output indicating that the sense signal has reached the target signal.

13. The motor controller of claim 12, wherein the sequencer logic control terminates the current pulse in response to a control pulse from the pulse generator.

14. The motor controller of claim 11, wherein the current command signal is representative of a desired motor current.

15. The motor controller of claim 11, wherein the soft commutation signal causes the peak current target circuit to reduce the target signal for a predetermined number of current pulses following each change of commutation state.

16. The motor controller of claim 11 wherein the motor controller is fabricated in an integrated circuit.

17. A method for controlling an electric motor having a plurality of motor terminals, the method comprising:
   producing current pulses as a function of a target value and sensed motor current;
   providing current pulses to one of the motor terminals during a commutation state;
   changing the commutation state; and
   adjusting the target value as a function of commutation state change.

18. The method of claim 17 wherein reducing the target value is for a predetermined number of current pulses following a change in commutation state.

19. The method of claim 17 wherein the target value is a function of a desired motor current.

* * * * *

UNITED STATES PATENT AND TRADEMARK OFFICE
CERTIFICATE OF CORRECTION

PATENT NO.   : 6,597,134 B2
DATED         : July 22, 2003
INVENTOR(S)  : Jason P. Brenden et al.

It is certified that error appears in the above-identified patent and that said Letters Patent is hereby corrected as shown below:

<u>Column 4,</u>
Line 65, delete "6020", insert -- 60° --

Signed and Sealed this

Fourteenth Day of October, 2003

JAMES E. ROGAN
*Director of the United States Patent and Trademark Office*